US 6,629,470 B2

(12) United States Patent
Brancolini

(10) Patent No.: US 6,629,470 B2
(45) Date of Patent: Oct. 7, 2003

(54) TRACTOR HAVING A HIGH SPEED SHIFT DEVICE

(75) Inventor: Emiliano Brancolini, Modena (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/902,082

(22) Filed: Jul. 10, 2001

(65) Prior Publication Data

US 2002/0017152 A1 Feb. 14, 2002

(30) Foreign Application Priority Data

Jul. 11, 2000 (IT) .................... BO2000A0416

(51) Int. Cl.[7] ............ F16H 37/00; F16H 37/06
(52) U.S. Cl. .............. 74/15.4; 74/15.66; 74/15.8; 74/15.82; 74/665 T
(58) Field of Search ............ 74/11, 15.4, 15.8, 74/15.82, 15.84, 15.86, 15.88, 15.66, 665 T

(56) References Cited

U.S. PATENT DOCUMENTS

| | | | | | |
|---|---|---|---|---|---|
| 4,615,240 A | * | 10/1986 | Weiss | ............ | 180/53.2 |
| 4,658,662 A | * | 4/1987 | Rundle | ............ | 74/15.2 |
| 4,750,580 A | * | 6/1988 | Umemoto | ............ | 180/247 |
| 4,961,721 A | * | 10/1990 | Sword et al. | ............ | 475/47 |

FOREIGN PATENT DOCUMENTS

EP 0 113 495 * 8/1983 ........ B60K/17/28

* cited by examiner

Primary Examiner—David A. Bucci
Assistant Examiner—Bradley J. Van Pelt
(74) Attorney, Agent, or Firm—John William Stader; Rebecca L. Henkel

(57) ABSTRACT

A tractor includes a frame, an engine, a transmission for selecting a number of vehicle speeds, and a device for transmitting power from the engine to a PTO mechanism. The tractor has a mechanism forming part of the device by which the tractor speed can be selected to be higher than any speed selectable by means of the transmission.

8 Claims, 3 Drawing Sheets

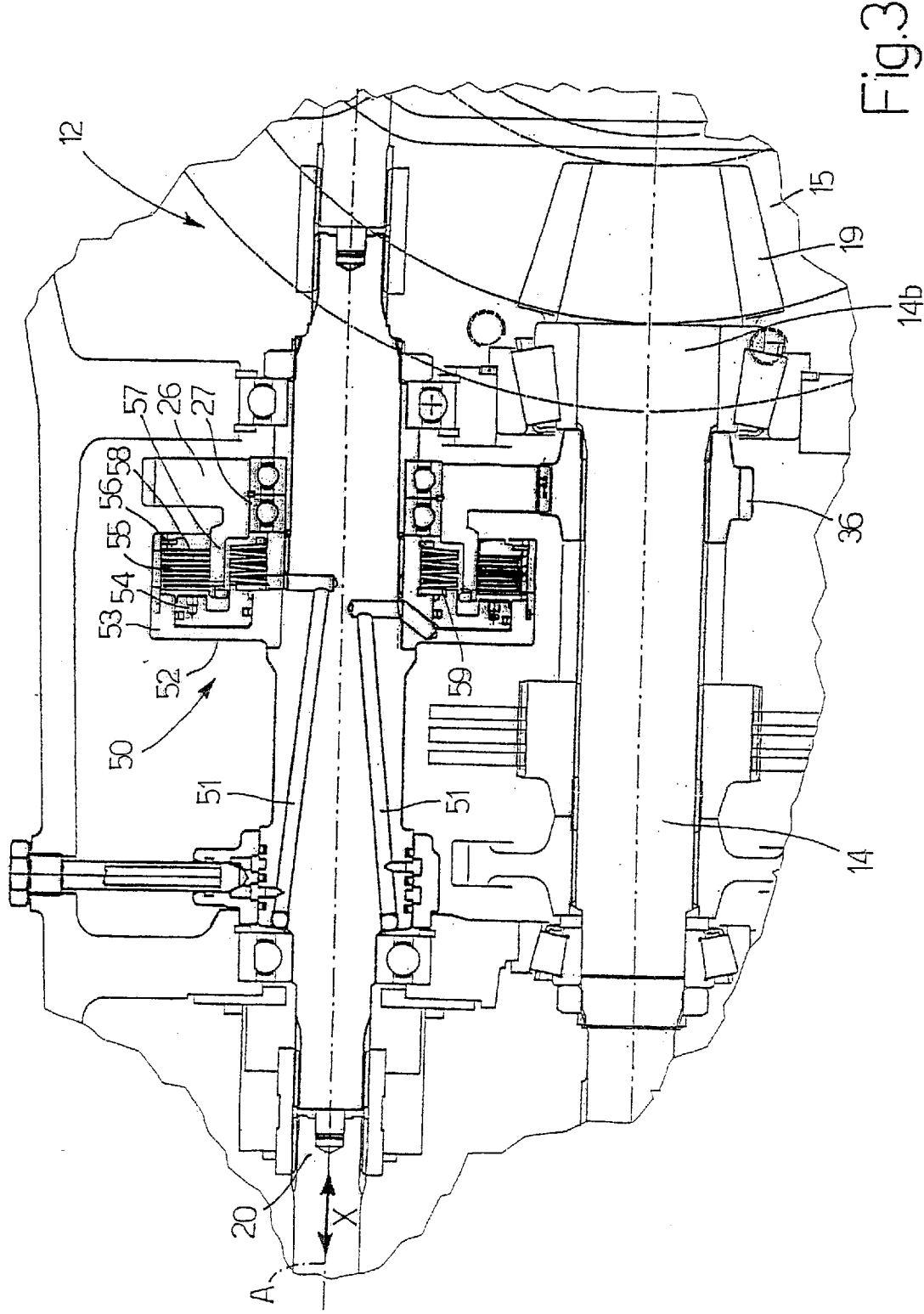

TRACTOR HAVING A HIGH SPEED SHIFT DEVICE

BACKGROUND OF THE INVENTION

This invention relates to a tractor having an arrangement for increasing the vehicle speed, and more particularly, relates to the use of the tractor PTO mechanism to obtain a high vehicle speed.

Currently marketed tractors are normally designed for a maximum speed of about 40 km/h, which is not normally exceeded to avoid impairing the on-road stability of the tractor, especially when an implement is attached.

There are times, however, when a higher speed is desirable, particularly in the case of wheeled tractors traveling frequently along asphalt roads, to prevent slowing down other road users.

Some solutions currently adopted to increase maximum tractor speed consist in equipping the transmission with gears designed to achieve the desired velocity ratios, which obviously increases the production cost and overall size of the transmission.

Other solutions concentrate directly on the bevel pinion/ring gear velocity ratio. This, however, results in an increase in all the speeds supplied by the transmission, which, in most cases, is unacceptable.

Other known solutions consist in a transmission comprising two subsystems: a first for achieving a given speed range, and a second for achieving higher speeds up to a maximum of 50 km/h. The outcome, however, is a highly complex transmission.

Moreover, full market coverage would mean producing and marketing tractor models with maximum 40 km/h transmissions, and others with 50 km/h transmissions, thus greatly increasing storage costs.

SUMMARY OF THE INVENTION

It is an object of the present invention to provide a vehicle, in particular a tractor, designed to eliminate the aforementioned drawbacks.

An inventive solution has been devised by which the device transmitting power to the rear power take-off (PTO) of the tractor is employed to achieve a velocity ratio in some way complementary to those obtainable with a conventional transmission.

As opposed to high-cost alterations to existing transmissions, the solution according to the present invention involves only minor mechanical alterations to the engine-PTO power transmission device, which remains substantially unchanged as a whole.

According to the present invention, there is provided a vehicle comprising a frame, an engine, a transmission for selecting a number of vehicle speeds, and a device for transmitting power from the engine to a PTO; the vehicle being characterized by comprising means forming part of the device for transmitting power from the engine to the PTO, and by which to select a vehicle speed higher than any speed selectable by means of the transmission.

These and other objects, features and advantages are accomplished according to the instant invention by providing a tractor having a frame, an engine, a transmission for selecting a number of vehicle speeds, and a device for transmitting power from the engine to a PTO mechanism. The tractor has a mechanism forming part of the device by which the tractor speed can be selected to be higher than any speed selectable by means of the transmission.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 3 shows a larger-scale detail of a second embodiment according to the present invention.

DETAILED DESCRIPTION OF THE PREFERRED EMBODIMENTS

Figure 1:
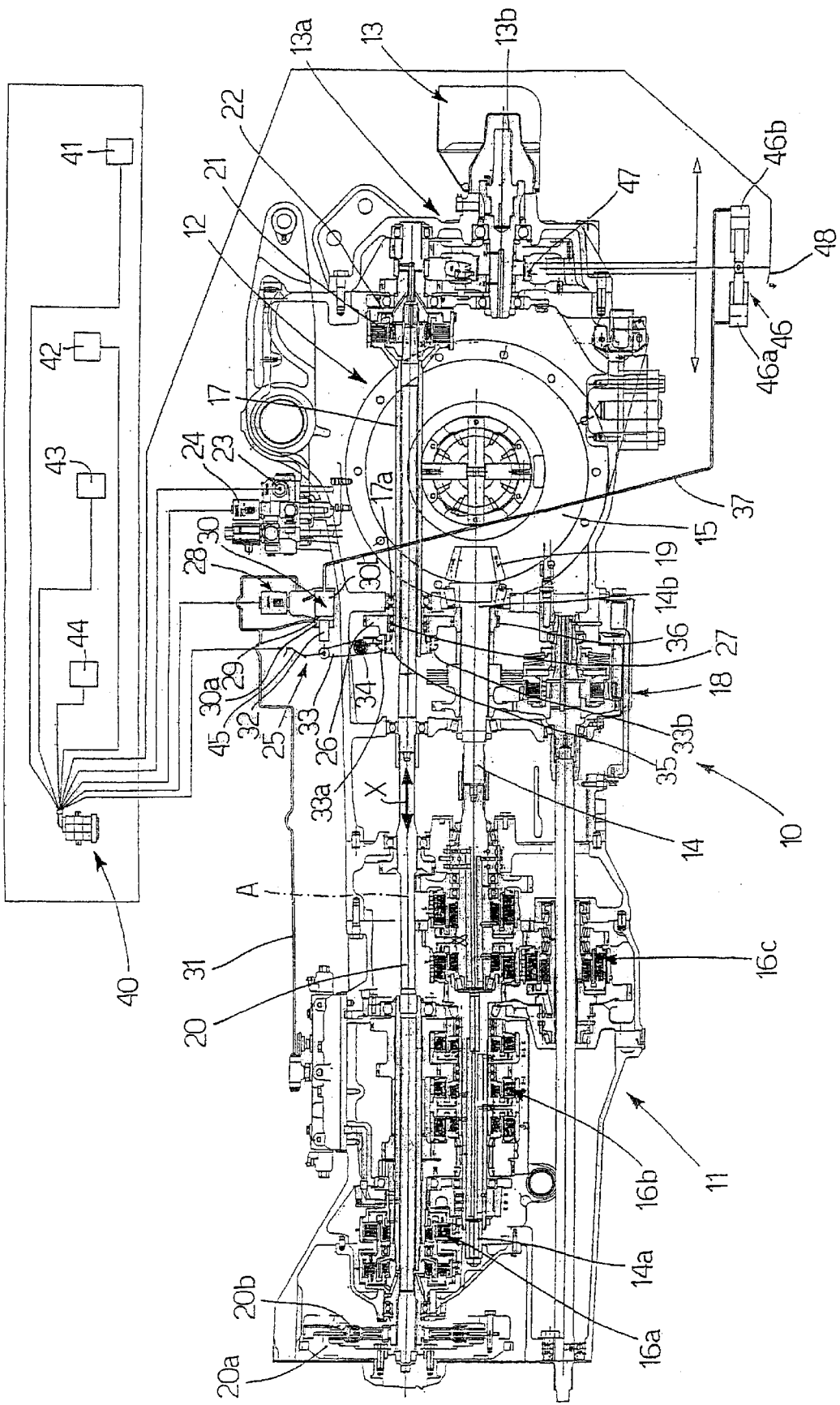
FIG. 1 shows an overall view of a first embodiment of the present invention.

Referring first to FIG. 1, the unit 10 for transmitting power to the drive wheels and rear power take-off of a tractor is shown only partly. Unit 10 can be divided theoretically into a transmission 11, and a device 12 for transmitting power to a rear power take-off (PTO) 13 comprising a series of gears 13a and a countershaft 13b for transmitting power to a conventional implement (not shown). Power is transmitted from an engine (not shown) to an intermediate shaft 14 by conventional transmission means described briefly below.

In particular, by means of three groups 16a, 16b, 16c of gears with respective clutches, power is transmitted from the conventional engine (not shown) to a ring gear 15 which, in turn, rotates two conventional rear drive wheels (not shown) of the tractor. The three groups 16a, 16b, 16c of gears form transmission 11. The embodiment depicted in FIG. 1 shows a so-called "Full Power Shift" transmission which, in this case, supplies the tractor with eighteen forward speeds and six reverse speeds. Transmission 11 operates in known manner and is therefore not described in detail.

As shown in FIG. 1, unit 10 also comprises a clutch 18 which, when activated by the operator, transmits power to the front wheels (not shown) to operate the tractor in "four-wheel-drive". Intermediate shaft 14 has two ends 14a, 14b, of which end 14b is fitted with a bevel pinion 19 meshing permanently with ring gear 15 which, as stated, directly powers the rear wheels (not shown) of the tractor. Power is actually transmitted from the engine (not shown) to the intermediate shaft 14 by a shaft 20, which also provides for, and forms part of the device 12 for transmitting power to rear power take-off (PTO) 13.

The shaft 20 has a longitudinal axis of symmetry A, and a flywheel 20a with a respective flexible coupling 20b. A clutch 21 and brake 22, controlled by respective solenoid valves 23 and 24 as described in detail later on, are located between the shaft 20 and PTO 13, and obviously provide, among other things described in greater detail below, for connecting and disconnecting the PTO 13 to and from shaft 20 under control of the operator.

The shaft 20 is also provided with a device 25 for connecting a gear 26 integrally to shaft 20, as described in detail later on. For which purpose, the shaft 20 is housed inside a sleeve 17 coaxial with axis A of the shaft 20 and which is supported by the tractor frame by means of a ball bearing 17a and is connected to the clutch 21 of the PTO 13. Gear 26 is in fitted idly to sleeve 17 by means of a ball bearing 27. The sleeve 17 extends between the clutch 21 at one end, and an integral hub 35 at the other end.

The device 25 is formed as a solenoid valve 28 for controlling the position of a piston 29 forming part of a hydraulic cylinder 30 supplied with oil under pressure by a utility line 31, e.g. at 17–18 bar pressure. The piston 29 is connected to a rod 32 which acts on a lever 33 rotating about a fixed pin 34. One end of lever 33 is hinged in a particular way (see below) to an internally toothed sleeve 33b, the teeth of which (not shown) mesh with grooves (not shown) on gear 26 to connect gear 26 integrally to sleeve 33b, and therefore to shaft 20, by means of hub 35, sleeve 17 and clutch 21.

The sleeve 33b must be so connected to lever 33 as to enable the sleeve 33b to rotate together with the gear 26 with no interference from the lever 33, which, as stated, can only rotate about the pin 34 when activated by the rod 32. For which reason, the bottom end 33a of the lever 33 has a fork (not shown) with pads (not shown) that engage in known manner a circular groove (not shown) formed on the outer surface of sleeve 33b.

Consequently, when clutch 21 is engaged, rotation of the shaft 20 produces a corresponding rotation of the sleeve 17 and integral hub 35. And, when the teeth (not shown) on sleeve 33b are inserted by the lever 33 inside and astride the seats on the outer surface of the hub 35 and on the gear 26, the gear 26 is made integral with the shaft 20. In other words, the two-way movement of the toothed sleeve 33b in a direction X defined by the longitudinal axis of symmetry A of the shaft 20 provides, at the operator's discretion, for making the gear 26 integral or idle with respect to the shaft 20.

When the gear 26 is made integral with the shaft 20 as described above, i.e. when the toothed sleeve 33b is connected to the gear 26 and to the hub 35, rotation of the shaft 20 is transmitted to a gear 36 integral with the shaft 14, so that power is transmitted to the bevel pinion 19 and, therefore, to the ring gear 15 to engage, in this case, a nineteenth forward gear corresponding to maximum tractor speed, e.g. 50 km/h. At the same time, the clutches of the three groups 16a, 16b, 16c of gears are all disengaged.

All operations are performed and controlled by means of an electronic central control unit 40 controlled by the operator, as will be seen, by means of a series of switches. The central control unit 40 is connected electronically to a series of switches 41, 42, 44 and a push-button control 43, the function of which are described later on in connection with the operation of unit 10.

The other devices forming part of unit 10 will now be described with reference to operation of unit 10. The first operating mode is a so-called "PTO mode". In this mode, the operator can select one of the eighteen forward speeds or one of the six reverse speeds in the usual way using transmission 11, and at the same time use PTO 13 by means of device 12. To do so, switch 41, for selecting "PTO mode" or a "full speed mode" (see below), is set by the operator to "PTO mode". The tractor is stationary but with the engine running. The solenoid valve 28 is set to "OFF", so that only chamber 30a of cylinder 30 is supplied with pressurized oil over line 31.

The lever 33 rotates clockwise, so that the sleeve 33b is disconnected from the gear 26, which, supported on the bearing 27, rests idly on the sleeve 17; and the chamber 30b, being drained of oil, allows the piston 29 to move freely rightwards. A switch 45 supplies electronic central control unit 40 with the information necessary to determine the position of sleeve 33b.

A double cylinder 46 of PTO 13 is subjected to no hydraulic stress, so that, by means of a manual control 47, the ratio of PTO 13 can be set, for example, between 540 and 1000 rpm. The selected ratio is transmitted to central control unit 40 by a switch 48. If the switch 42 for activating PTO 13 has not yet been pressed by the operator, the solenoid valve 23 for engaging and releasing the clutch 21 is in the "OFF" position so that the clutch 21 is released, while the solenoid valve 24 for engaging and releasing the brake 22 of PTO 13 is in the "ON" position so that the brake 22 is engaged. At this point, the operator, using the switch 42, can switch the solenoid valve 23 to "ON" and the solenoid valve 24 to "OFF" to engage the clutch 21 and release the brake 22, so that power is transmitted by the device 12 from the engine to the PTO 13.

In other words, the PTO 13 is activated or not by means of the switch 42, which acts on solenoid valves 23, 24 following operator selection of "PTO mode" or "full speed mode" by means of switch 41. In some applications, a switch 44 is also provided to enable the operator to cut out the brake 22 even when the clutch 21 is released. This is especially useful when a rotating implement with a high inertial mass is attached to the PTO 13; in which case, engaging the brake 22 with rotating masses attached to the shaft 13b of PTO the 13 could result in wear of the brake 22.

As stated, in "PTO mode", the operator can select from eighteen forward and six reverse tractor speeds using the transmission 11, and at the same time may or may not operate the PTO 13 by means of switch 42. Gear shifting is obviously performed by means of push-button control 43.

To select "full speed mode", the operator again simply uses the switch 41. The selection of this mode of operation is also done with the vehicle stationary and the engine running; and the central control unit 40 switches the solenoid valve 28 to "ON" to also feed pressurized oil to the chamber 30b of hydraulic cylinder 30.

In other words, activating solenoid valve 28 also supplies the chamber 30b of cylinder 30 with pressurized oil, which, coming from the same line 31, is at the same pressure as the oil fed to the chamber 30a. Since, however, the face of the piston 29 on the chamber 30b side has a greater area than the face on the chamber 30a side, which is partly occupied by the rod 32, the difference in pressure on the two faces moves the rod 32 leftwards to rotate the lever 33 counterclockwise about the pin 34.

Rotation of the lever 33 moves the sleeve 33b rightwards in direction X to connect the gear 26 to the hub 35. That is, the gear 26 is made integral, as described previously, with the shaft 20 to transmit power from the shaft 20 to the bevel pinion 19, and therefore to the ring gear 15, to shift into maximum vehicle speed which, as stated, may be 50 km/h. This nineteenth gear is again engaged by the operator using push-button control 43.

In other words, the shaft 20, which is normally only used to transmit power to PTO 13, is used by the operator to shift the vehicle wheels into nineteenth gear using push-button shift control 43, which acts on activation or not of the solenoid valve 23 and the clutch 21. The switch 45 supplies the central control unit 40 with the necessary information to determine the position of the sleeve 33b in the direction X.

A pressurized-oil feed line 37 is provided between solenoid valve 28 and double cylinder 46. The double cylinder 46, having the same pressure on both sides 46a, 46b by the solenoid valve 28 being set to "ON", centers the shift control 47 into neutral, which is detected by switch 48. The solenoid valve 23 will be set to "ON", so that the clutch 21 will be engaged when the nineteenth gear is selected, while the solenoid valve 24 is set to "OFF", i.e. brake 22 is released.

It should be pointed out that there must be no positive retention of the manual shift control 47 setting, to enable the double cylinder 46 to be centered into neutral when, as seen, switching from "PTO mode" to "full speed mode".

In "full speed mode", since the clutch 2 is engaged and brake 22 is released, not only the sleeve 17 but also the gears 13a of the PTO 13 will be rotated. However, since double cylinder 46 is set to neutral and the operator cannot select the speed of the shaft 13b of the PTO 13 using shift control 47, the shaft 13b does not rotate. In "full speed mode", therefore, the rotating parts are the shaft 20, the clutch 21, the sleeve 17, the hub 35, the sleeve 33b, the gear 26 meshing with the gear 36, and the gears 13a of the PTO 13, but not the shaft 13b of the PTO 13.

Figure 2:
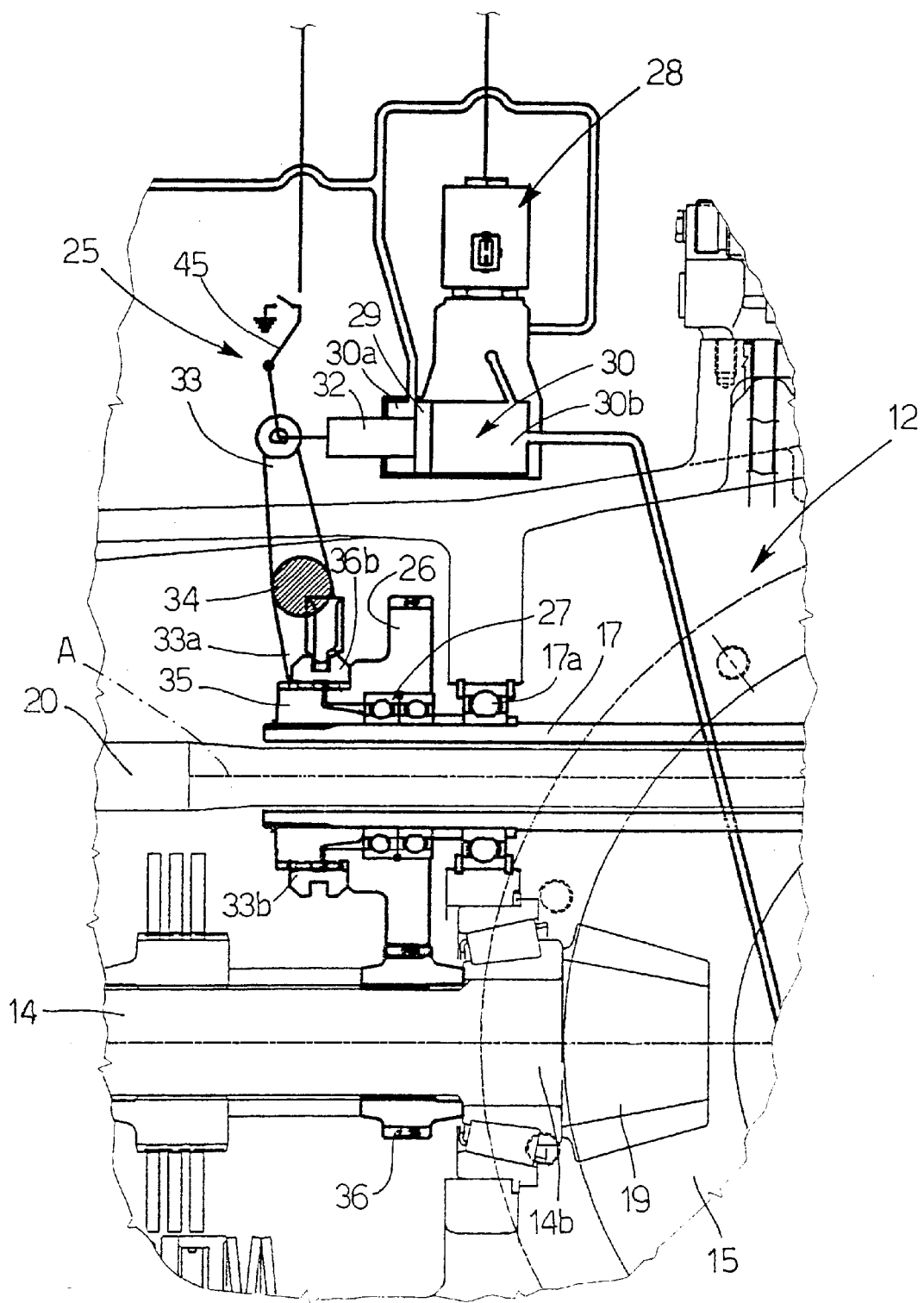
FIG. 2 shows a larger-scale detail of FIG. 1.

As stated, in "full speed mode", the clutches of the transmission 11 must all be released by means not shown in the accompanying drawings. As stated, the maximum speed of, say, 50 km/h, is again selected by the operator using push-button control 43. FIG. 3 shows a second embodiment of the present invention. In this embodiment, the device 25 is replaced by a device 50 for making gear 26 integral or not with shaft 20, and which, while operating on a different principle, has exactly the same effect on the gear 26 as device 25 described with reference to FIGS. 1 and 2.

The device 50 includes two pressurized-oil feed channels 51 formed in the shaft 20 and for feeding oil to a bell 52 integral with the shaft 20 and coaxial with axis A. The bell 52 has an inner chamber 53 and houses a piston 54; chamber 53 is fed with pressurized oil along channels 51 to move the piston 54 rightwards in direction X; and the piston 54 is connected by known means to a cylindrical member 55 from which a pack of annular plates 56 project perpendicularly to axis A of the shaft 20.

In the FIG. 3 embodiment, the gear 26 has a hub 57, from which project the annular plates 58 alternating with the plates 56, which, as stated, are integral with cylindrical member 55, in turn integral with the piston 54.

The piston 54 is stressed elastically by a spring 59 coaxial with axis A and which tends to restore the piston 54 to its original position. In the second embodiment shown in FIG. 3, the switch 41 in the first embodiment in FIG. 1 is dispensed with, since no mode selection is required.

In actual use, when push-button control 43 is activated by the operator, central control unit 40 commands pressurized-oil feed to chamber 53 via channels 51 and a solenoid valve (not shown). The oil entering chamber 53 moves piston 54 and integral cylindrical member 55 rightwards, so that each plate 56 is also moved rightwards into contact with the surface of an adjacent the plate 58 integral with hub 57. If, therefore, during rotation, the plates 56 do not slide with respect to plates 58, the gear 26 acts as if it were fitted to, as opposed to being idle with respect to, the shaft 20.

Consequently, if the gear 26 is no longer idle with respect to the shaft 20, power can be transmitted from the shaft 20 to the gear 36 to rotate the bevel pinion 19 meshing permanently with the ring gear 15 of the tractor wheels. In this case, too, the velocity ratio between the gear 26 and the gear 36 is obviously such as to achieve the desired maximum speed of the rear wheels of the tractor. In the second embodiment, too, the clutches of transmission 11 are obviously released when shifting into nineteenth gear.

The main advantage of the unit 10 of the tractor according to the present invention lies in the possibility of shifting to a fairly high speed (e.g. 50 km/h) using the shaft 20 of the PTO 13 power transmission device 12.

Using the same transmission 11, therefore, end users may select between a version with no device 25 or 50, and a possibly more expensive version designed for a maximum speed of 50 km/h, with no alterations to transmission 11, which may be standard for all models.

Moreover, since the clutches of transmission 11 are released when shifting into nineteenth gear, i.e. in "full speed mode", power dispersion of transmission 11 in this mode is considerably reduced.

Though the invention is illustrated with reference to a so-called "Full Power Shift" transmission, all the teachings referred to above may obviously also be applied to other transmission systems, such as a so-called "High/Low" or "Semi-Power Shift" transmission.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a frame supported by ground-engaging wheels, an engine supported by said frame, a transmission with clutches, said transmission interconnecting said engine and said wheels and operable to select a number of vehicle speeds, and a device for transmitting power from said engine to a PTO mechanism, the improvement comprising:

said device including a high speed mechanism that is capable of selecting a higher vehicle speed which is greater than any of said number of vehicle speeds selectable by said transmission; the connection of said high speed mechanism causing said transmission clutches to automatically disengage, but involving no other change in said transmission in order to select said higher vehicle speed; and an apparatus for switching from a PTO mode, wherein a shaft of said PTO mechanism rotates, to a full speed mode, wherein said shaft does not rotate, said PTO mechanism including first and second gears having a velocity ratio corresponding to said higher vehicle speed which are rotated when said full speed mode is selected.

2. The improvement of claim 1 wherein said high speed mechanism comprises a bell housing a piston; a first number of plates integral with said piston; and a second number of plates alternating with said first number of plates, said second number of plates being integral with a first gear, hydraulic activation of said piston bringing each of said first number of plates into contact with a corresponding plate of said second number of plates, so as to make said first gear integral with a shaft forming part of said high speed mechanism.

3. The improvement of claim 1 wherein said PTO mechanism comprises a double cylinder; and a manual shift control enabling the operator to select the rotation speed of said shaft of the PTO mechanism, said double cylinder being set to a neutral position by a solenoid valve and by a hydraulic connecting line.

4. The improvement of claim 3 wherein setting of said manual shift control does not include a positive retention to switch from said PTO mode to said full speed mode, so that said solenoid valve and hydraulic connecting line may put said double cylinder in said neutral position.

5. The improvement of claim 3 wherein said high speed mechanism comprises a toothed sleeve coupling for selectively connecting said first gear integrally to a hub and integral with a sleeve forming part of said high speed mechanism.

6. The improvement of claim 5 wherein said toothed sleeve coupling is moved selectively by a lever hinged to a pin, said lever being activated by a rod of said solenoid valve.

7. The improvement of claim 6 wherein connection of said high speed mechanism forming part of said device automatically disengages all clutches of said transmission.

8. The improvement of claim 6 wherein all operations of said device are controlled by an electronic central control unit.

* * * * *